(12) United States Patent
Hsu

(10) Patent No.: US 6,993,363 B1
(45) Date of Patent: Jan. 31, 2006

(54) WIRELESS MONITOR TOOL FOR A MOBILE STATION

(75) Inventor: Jay Hsu, Bedminster, NJ (US)

(73) Assignee: Cellco Partnership, Bedminster, NJ (US)

(*) Notice: Subject to any disclaimer, the term of this patent is extended or adjusted under 35 U.S.C. 154(b) by 312 days.

(21) Appl. No.: 10/322,423

(22) Filed: Dec. 19, 2002

(51) Int. Cl.
H04B 1/38 (2006.01)
H04M 1/00 (2006.01)
H04H 7/00 (2006.01)
H04Q 7/20 (2006.01)

(52) U.S. Cl. ............ 455/567; 455/3.06; 455/515
(58) Field of Classification Search ............ 455/9, 455/567, 515, 550.1, 88, 11.1, 3.06, 404.1, 455/522, 69; 379/458, 459, 460, 417, 106.02
See application file for complete search history.

(56) References Cited

U.S. PATENT DOCUMENTS

| | | | |
|---|---|---|---|
| 4,748,655 A | | 5/1988 | Thrower et al. |
| 5,592,533 A | | 1/1997 | McHenry et al. |
| 5,722,071 A | * | 2/1998 | Berg et al. ............ 455/41.2 |
| 5,848,362 A | * | 12/1998 | Yamashita ............ 455/567 |
| 5,870,685 A | * | 2/1999 | Flynn ............ 455/573 |
| 5,877,675 A | * | 3/1999 | Rebstock et al. ...... 340/286.07 |
| 6,112,100 A | * | 8/2000 | Ossoinig et al. ............ 455/502 |
| 6,275,577 B1 | * | 8/2001 | Jackson ............ 379/211.01 |
| 6,381,472 B1 | | 4/2002 | LaMedica, Jr. et al. |
| 2004/0235514 A1 | * | 11/2004 | Bloch et al. ............ 455/501 |

* cited by examiner

Primary Examiner—William Trost
Assistant Examiner—Wesley Kim
(74) Attorney, Agent, or Firm—McDermott Will & Emery LLP

(57) ABSTRACT

In disclosed embodiments, a relatively small passive monitor tool provides one or more alerts to a user of a mobile station, to readily notify the user, even if the station is carried in a pocket or purse. In one example, the tool listens for a message on a paging channel of the wireless network, indicating an incoming call or the like intended for the mobile station. Upon detecting the incoming paging signal, the tool provides its own perceptible alert to the user. In another example, the tool listens to the access channel for periodic keep-alive signals from the mobile station. When the monitor tool fails to detect such signals from the station, for example, for some interval, the tool provides another perceptible alert to the user. This second alert may indicate low-battery, an out-of-range mobile station, or that the mobile station signals are blocked by some obstacle.

16 Claims, 3 Drawing Sheets

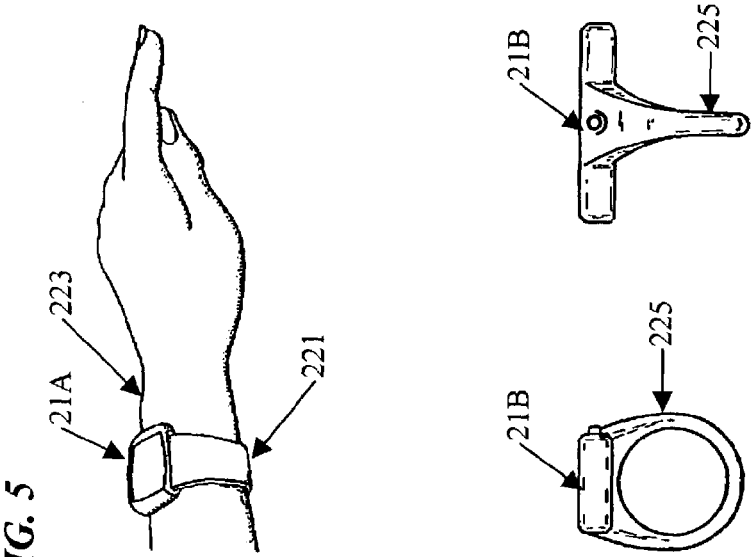
FIG. 5
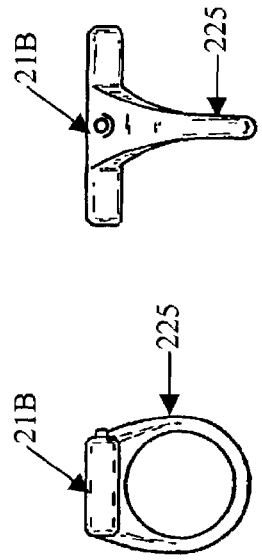
FIG. 6A
FIG. 6B
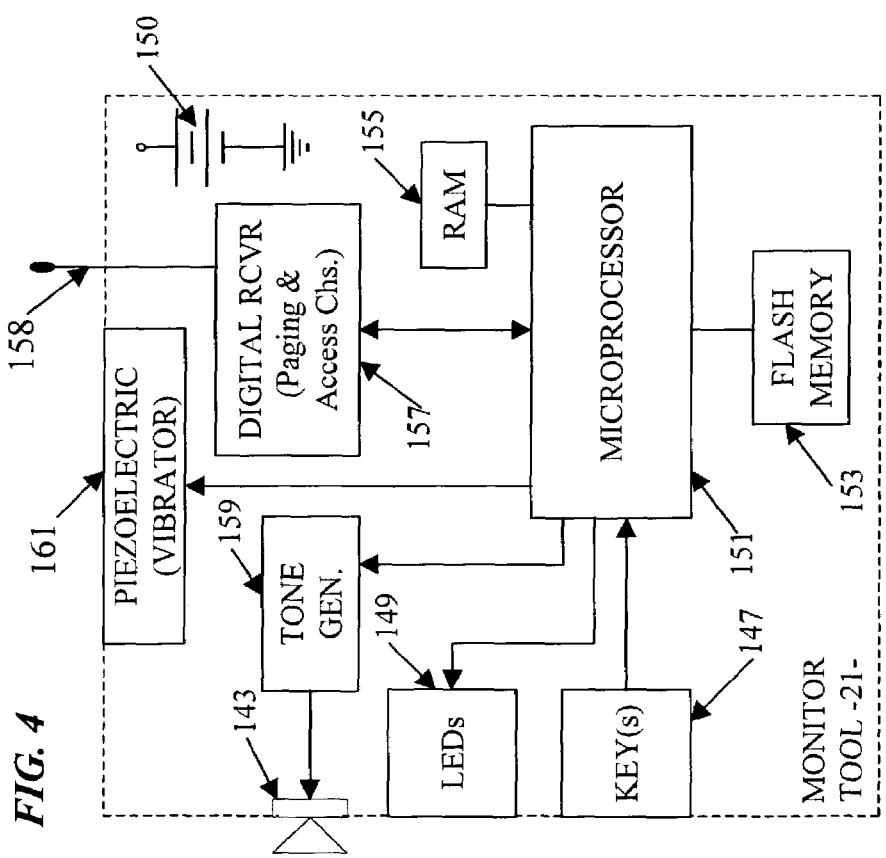
FIG. 4

WIRELESS MONITOR TOOL FOR A MOBILE STATION

FIELD OF ENDEAVOR

The present subject matter relates to techniques and equipment to monitor signaling communications to and/or from a predetermined mobile station and provide ancillary notice regarding the status of the monitored station, for example, ringing or the like in the event of an incoming call or message, or notification of a low-battery condition.

BACKGROUND

Modern society offers people many opportunities and in fact places many demands on people to communicate with each other, often over great distances. Modern society also is becoming increasingly mobile. To meet the demand for mobile communications, many new communications services have emerged, to allow people to communicate freely as they roam, without the need for a fixed network connection.

Common examples of mobile communications services include cellular telephone service, personal communication service (PCS), personal digital assistants (PDAs) with wireless communications capabilities, wireless e-mails through Blackberries or the like, and even two-way paging services. For any such service, the user has a mobile station, which provides two-way communication via an appropriate wireless communication network and serves as the user's terminal device.

As part of its operation, a mobile communication station provides a number of status indicators to the user. The cellular telephone for example, provides a "ringing" notice of an incoming call. In modern examples of such telephones, the actual notification typically includes a display and an audible tone, and most such phones offer a "vibration" mode in which the unit vibrates in a perceptible manner. Typically, the user can select between several different types of available ringing tones and one or more vibration modes. Such mobile stations will often provide another tone and attendant display for at least one other condition, such as low battery.

The mobile station usually comes equipped with a good size battery. Typically, the mobile station also has a display screen for data output and a keypad for data entry. To contain such elements of useful size, yet maintain portability, there is a physical limitation on the form factor of mobile station. The station can only become so small yet provide all the necessary features. Today, most mobile stations have holders that allow the user to attach the unit to a belt or the like. Although many users find carrying their mobile stations in this way convenient, others prefer to carry their units in their pockets, purses or the like.

However, when transported in such a manner, the user of a mobile station may not hear the tone signals provided by the mobile station, particularly in a high-noise environment; and the user may not be able to feel a vibrating call indication. Increasing the power, for example of the audible tone generation, may help make the notification more readily perceptible. However, even increased power may not always be adequate; and the increased power reduces battery life, which is a critical resource in a portable communication device. As a result, a person who does not like to hang the mobile phone on a belt or the like, can easily miss the incoming call, especially when mobile phone is in vibration mode. The other problem is such a user may not know when the station is running out of battery, because the user may not timely view the low-battery indicator on the station's display.

Hence a need exists for a technique to extend status notifications from a mobile station, in situations in which the station's normal status signaling may not be readily perceptible by the user. Extension of such signaling should not draw excessive power from the station's battery, so as to maintain the maximum useful battery life for the station. Also, for commercial and economic reasons, the technique for providing extended notification should not require substantial modification of the mobile station.

SUMMARY

The inventive concepts alleviate the above noted problems with providing status messages to users of mobile stations in such a manner as to readily alert the user to a new status of the station, even if the station itself is carried or located separately where the station's own signaling would not be readily perceptible to the user. The disclosed technique extends one or more of the alert notification signals regarding station status by using a separate monitor device to listen for communications to and/or from the mobile station. Upon detecting a status condition corresponding to an alert message, the monitor tool provides an appropriate perceptible alert to the user.

In one example, the monitor tool listens for and detects a paging message or other incoming message notification signal intended for the mobile station, on a signaling channel of the wireless network. In a mobile telephone service application, this type of message normally causes the mobile station to ring. The paging signal or the like will include an identification of the mobile station, to which the incoming message should be directed. Upon detecting such a signal, the monitor provides its own corresponding perceptible alert to the user. The signal may be a tone signal, a light and/or a vibration.

In another example, the monitor tool listens to the uplink access channel. An active mobile station normally transmits over this channel on some known periodic basis, to maintain its registration with the wireless telecommunications network, even when the mobile station is not actively engaged in a communication session. Stated another way, the mobile station periodically sends a 'keep-alive' signal over the access channel. The mobile station includes its own identification in the keep-alive signal. The monitor tool listens for the periodic keep-alive signal. When the monitor fails to detect the uplink signal from the mobile station, for example, for some period of time, the monitor provides a perceptible signal to the user. In an embodiment, this perceptible signal signifies low-battery, but the monitor tool may provide a similar signal at other times, for example, when the mobile station is out of range of the monitor or the mobile station signals are blocked by some obstacle in the surrounding environment, such as a building.

The monitor tool may be housed in any manner that is desirable and convenient for a user to wear or carry in such a manner that the perceptible signals produced by the monitor are easier for the user to detect than those from the mobile station when the mobile station is carried in a purse, pocket or the like. For example, the monitor tool may be worn in a manner similar to a wrist-watch, or incorporated into a housing with a wristwatch. In other examples, the tool monitor may be constructed into a ring or into a housing that may be worn as a pendant. The monitor tool may also be constructed into a pair of eyeglasses, or even into a set of headphones that may be used with an independent portable electronic entertainment unit.

Because the monitor tool is a separate device, the monitor does not draw power from the battery of the mobile station. The monitor tool is programmed with information to allow it to identify signaling addressed to or sent from the particular mobile station. However, use of the monitor tool with the mobile station does not require any actual modification or enhancement to the mobile station, itself.

Additional objects, advantages and novel features of the examples will be set forth in part in the description which follows, and in part will become apparent to those skilled in the art upon examination of the following and the accompanying drawings or may be learned by production or operation of the examples. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4 is a block diagram of an example the monitor tool.

FIG. 5 shows an example of the monitor tool enabling the user to wear it on a wrist.

FIGS. 6A and 6B show views of an example of the monitor tool embodied in a ring, to enable the user to wear the tool on a finger.

DETAILED DESCRIPTION OF THE EXAMPLES

The various examples disclosed herein relate to providing a small size separate monitor tool, for monitoring communications to and/or from a mobile station and providing alert signals regarding the status of the mobile station as detected from the monitoring of the station's communication signals. As discussed above, the mobile station may be any mobile wireless communication device that a user may have or operate in order to access communication services of a wireless telecom network. Examples include cellular telephones of various types, personal communication service (PCS) telephones, personal digital assistants (PDAs) with wireless communications capabilities, wireless e-mails devices such as Blackberries or the like, and two-way pagers. Those skilled in the art will recognize that the concepts disclosed herein may apply to yet further types of mobile stations for other types of wide area roaming wireless communications services.

For purposes of understanding a specific example, further discussion will focus on an embodiment of the monitor tool associated with a cellular telephone station. Although those skilled in the art are presumably familiar with cellular telephone networks and cellular telephone devices, for completeness, the discussion below will provide summary descriptions thereof where it is believed that such descriptions may be helpful to the reader.

Figure 1:
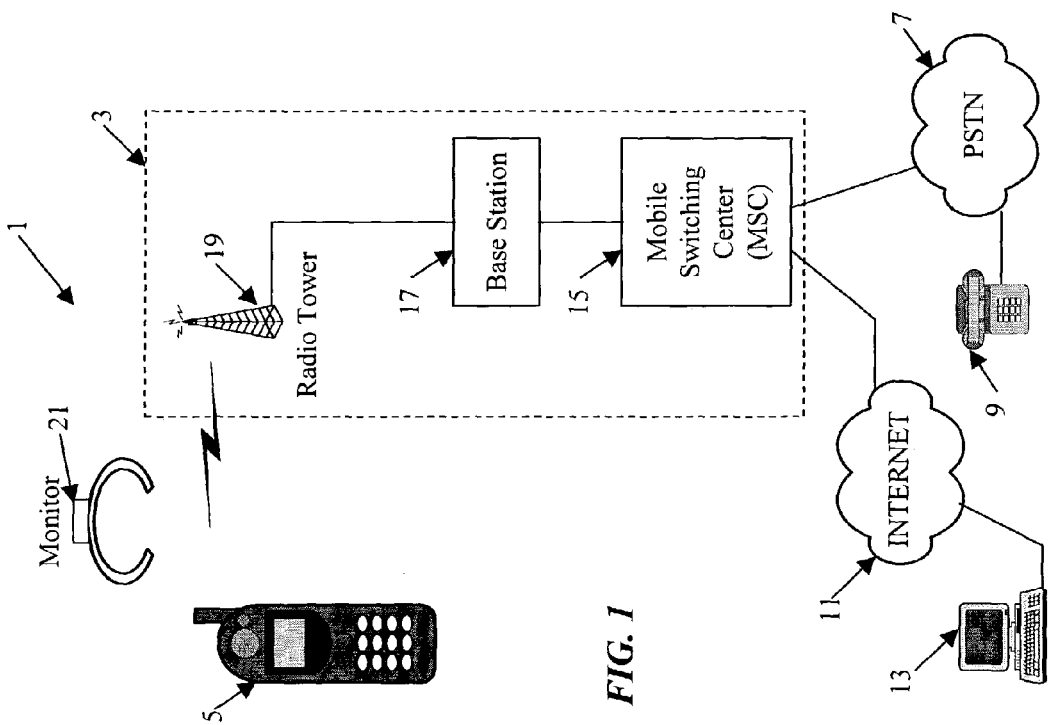
FIG. 1 is a simplified block diagram of a public wireless telephone network, showing a mobile station and an example of the monitor tool.

Reference now is made in detail to the examples relating to cellular telephone services, as illustrated in the accompanying drawings and discussed below. In the drawings, FIG. 1 depicts a communication system 1 for providing voice telephone communications as well as data services. As shown, the system 1 includes a wireless communication network 3 that provides wireless telephone or personal communications service (PCS) type services to mobile stations depicted by way of example as a mobile handset 5. The network 3 enables users of the mobile stations 5 to initiate and receive telephone calls to each other as well as through the public switched telephone network (PSTN) 7 to telephone devices 9. The network 3 may also enable users of the mobile stations 3 to initiate and receive various data communications, for example via the public data network referred to as the Internet 11 to send or receive data from other digital devices represented by the exemplary computer 13. The network 3 provides wireless communication services in accord with a digital protocol or an analog protocol or both.

The network 3 includes a number of mobile switching centers (MSCs) 15, one of which appears in the drawing for simplicity of illustration. Each MSC 15 connects through trunk circuits to a number of base stations 17, which the MSC controls.

The base station or base transceiver system (BTS) at 17, is the part of the radio network 3 that sends and receives RF signals to/from the mobile stations 5 that the base station currently serves. The base station 17 connects to and communicates through the antenna systems on a radio tower 19. The base station 17 contains the transmitters and receivers at a site and is responsible for the control, monitoring, and supervision of calls made to and from each mobile station 5 within its serving area, over the wireless air link. The base station 17 assigns and reassigns channels to the mobile stations and monitors the signal levels to recommend handoffs to other base stations (not shown).

The network 3 typically includes a base station controller (BSC) functionality that controls the functions of a number of base stations 17 and helps to manage how calls made by each mobile station 5 are transferred (or "handed-off") from one serving base station 17 to another. Each wireless network equipment vender implements this function differently. Some vendors have a physical entity, which they call a BSC, while other vendors include this functionality as part of their mobile switching center (MSC). For convenience of illustration, it is assumed that the BSC functionality in the network 3 is incorporated into the MSC 15.

In the example, through the MSC 15 and the base stations 17, the network 3 provides voice-grade telephone services over the common air interface to and from the mobile stations 5. The network 3 may include one or more additional elements (not separately shown), such as an interworking function (IWF) or a Packet Data Serving Node (PDSN) to support data services over the logical communication channels of the wireless air interface, for example for the communications via the Internet 11.

A typical wireless network, such as the network 3, utilizes a number of logical channels for signaling related to the network services, for example for paging called stations, registration, and the like. Of note for purposes of the discussion here, the network 3 sends alert messages to the mobile station 5 over the paging channel, for example, when there is an incoming call to the station 5 or an incoming data message (e-mail or the like). The paging channel alert message contains address information specifically identifying the particular mobile station 5, and possibly information distinguishing the particular type of incoming call or message. In a typical cellular telephone network, the address information includes the mobile identification number (MIN) and/or the electronic serial-number (ESN) of the particular station 5.

In the uplink direction, the mobile station 5 registers with the network 3. Once registered, the mobile station 5 periodically sends messages to the network 3 over the uplink access channel, to maintain its registered station. The periodic uplink messages on the access channel will also include the MIN and/or the ESN of the mobile station 5.

The mobile telephone station 5 includes a transceiver compatible with the particular type of wireless network 3. Using the transceiver, the mobile station communicates with mobile system all the time. For example, the station communicates through the paging channel and the access channel even when there is no voice or data communication. Monitoring of the signaling on channels, such as the paging and access channels, can provide useful information about the status of the user's mobile station 5.

For purposes of providing the extended status alerts to the user of the mobile station 5, the mobile telephone station 5 has an associated monitor tool 21. The monitor tool 21 may be a watch sized device or otherwise embodied in a form that the user may prefer to carry in a location that allows the user to easily perceive the various alert signals provided by the tool. The tool 21 can passively monitor both uplink and downlink signals with very little battery power. The device and be tuned to a specific mobile station 5, by programming the monitor tool 21 with the combination of MIN and ESN. However, the tool is a separate device and operates independently of the actual mobile station.

For a CDMA implementation of the network 3 and the mobile station 5, the downlink paging signal is sent through page channel, and the uplink signal is through an access channel. TDMA and GSM networks utilize similar logical channel arrangements for signaling, although the physical channelization may vary. The monitor tool 21 has receiving equipment similar to that in the station 5 to receive the paging channel and similar to that in the base station 17 for receiving the access channel. However, the tool need not include any additional receiver circuitry or processing circuitry for handling of traffic channels, e.g. for voice or data. Also the tool is a "receive only" device and does not include processing or transmitter equipment for sending signaling or for sending user communications (e.g. voice or data).

Effectively, the monitor tool listens for and responds to certain signals on the paging and access channels that are addressed for (to or from) the particular mobile station 5 (e.g. containing the MIN and/or ESN of the particular mobile station). Assuming that the monitor has receiving equipment of similar resolution to that used to receive the paging and access channels by other elements of the system 1, the only physical restriction on location of the monitor 5 is that it must be in the same RF coverage area (cell site sector) as mobile the mobile station 5, in order to properly receive signaling going to and coming from the station 5.

The small portable monitor tool 21, which has been programmed with the MDN and ESN of the user's mobile station, can passively listen to the paging channel of the mobile system on behalf of the user's mobile station and provide an alert to an incoming message, even when the actual mobile station is muffled by a purse or coat or the like. If the tool's alert output is visible and/or tactile, the alert from the monitor may also be more readily perceptible even in high-noise environments. In the example, the portable monitor tool 21 also monitors the access channel for periodic uplink transmissions from the mobile station 5. The monitor tool 21 will provide an alert indicating the status of the mobile station 5, for example, when the mobile station is running low on battery.

As outlined above, the monitor tool 21 includes receiving equipment similar to that used in other elements of the system 1. The monitor tool 21 also includes alert mechanisms similar to those found in the mobile station 5. To fully appreciate the monitor tool 21, it may be helpful first to review the general structure and operation of an example of a mobile station 5 and then consider an example of a monitor tool 21.

Figures 2, 3:
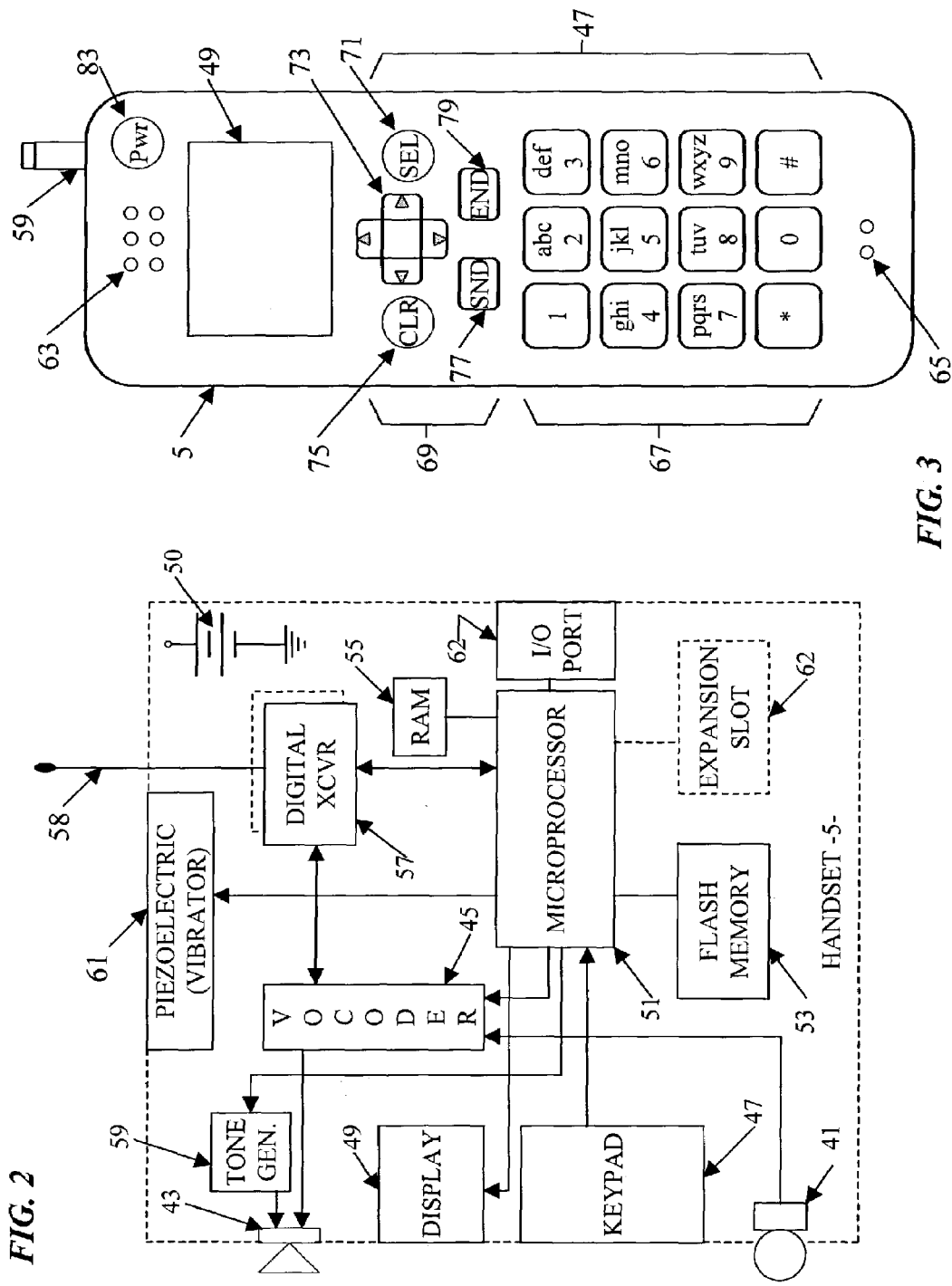
FIG. 2 is a block diagram of an exemplary mobile station in the form of a digital wireless telephone station.
FIG. 3 is a plan view of the exemplary wireless telephone station of FIG. 2.

FIG. 2 is a functional block diagram, and FIG. 3 is in a plan view, illustrating a digital telephone implementation of the mobile station 5. Although the station may be incorporated into a vehicle mounted mobile unit or into another device, such as a portable personal computer or PDA, for discussion purposes the illustrations show the station 5 in the form of a handset.

The handset embodiment of the mobile station 5 functions as a normal digital wireless telephone station. For that function, the station 5 includes a microphone 41 for audio signal input and a speaker 43 for audio signal output. The microphone 41 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of the wireless telephone network communications.

For digital wireless communications, the handset 5 also includes a digital transceiver (XCVR) 57. The concepts discussed here encompass embodiments of the station 5 utilizing any digital transceivers that conform to current or future developed digital wireless communication standards. For example, the transceiver 57 could be a TDMA or GSM unit, designed for cellular or PCS operation. In the present embodiments, the digital transceiver 57 is a CDMA transceiver. The transceiver 57 provides two-way wireless communication of information, such as vocoded speech samples and digital message information. The transceiver also sends and receives a variety of signaling messages in support of the various services provided via the station 5 and the network 3. The transceiver 57 connects through RF send and receive amplifiers (not separately shown) to an antenna 58. The station 5 may include one or more additional transceivers, as shown in dotted line form, for operation in an analog mode or in accord with an alternative digital standard.

As shown, the digital telephone handset 5 includes a display 49 for displaying messages, a menu generated by a client browser program, call related information, dialed and calling party numbers, etc. A keypad 47 enables dialing digits for voice and/or data calls and generating selection inputs keyed by the user based on the displayed menu. As shown, the digital telephone handset 5 includes a display 49 for displaying messages, a menu generated by a client browser program, call related information, dialed and calling party numbers, etc. For example, during ringing for an alert to an incoming call, the display 49 may display caller ID information, if available. The display will also provide one or more indicators of station status, for example an icon indicating the current level of charge on the battery 50 and/or a textual 'low-battery' indication when the current level of charge on the battery 50 falls below a threshold.

A microprocessor 51 controls all operations of the handset 5. The microprocessor 51 is a programmable device. The mobile unit 5 also includes flash type read only memory (ROM) 53 and/or a non-volatile random access memory (RAM) 55, for storing various software routines and mobile configuration settings, such as mobile identification number (MIN), etc. In a present implementation, the random access memories store an operating system, vocoder software, client browser software, device driver software, call processing software, and short message service software. The memories also store data, such as telephone numbers and other data input by the user via the keypad 47.

The mobile station 5 also includes one or more elements for providing perceptible alert signals to the user. In the illustrated example (FIG. 3), the station 5 includes a tone generator 59 coupled to the speaker 43 and a piezoelectric element 61 serving as a vibrator.

The microprocessor 51 provides instructions to the generator 59 to generate various output tones through the speaker 43, upon occurrence of various conditions, such as a user selected ring tone in response to an incoming call or message. The program of the microprocessor 51 may also cause the microprocessor 51 to instruct the generator 59 to generate a beep or other selected output tone through the speaker 43, as an audible indication of low battery (alone or together with a "low battery" indication on the display 49). Although shown separately, the tone generator function may be performed within the microprocessor 51.

In a similar fashion, the microprocessor 51 provides instructions to the piezoelectric element 61 to cause perceptible vibrations. Typically, the vibratory notice is used as an alternative to or in addition to one or more of the ringing alert tones. However, the programming of the microprocessor 51 may also cause the station 5 to generate tactile alert signals in response to other selected conditions.

The program of the microprocessor 51 also controls other operations of the station 5. For example, if battery power falls too low to permit further operation, the microprocessor will shut down operations of the station. Of note, this will terminate signaling communications by the transceiver 57, including transmission up stream over the access channel.

A cellular telephone implementation of the mobile station 5 may also include an input/output (I/O) port 62 coupled to the microprocessor 51. The I/O port 62 enables two-way exchange of data between the mobile station 5 and an external device, such as a portable computer, for example to allow the mobile station 5 to act as modem or the like for data communication services for the portable computer through the network 3.

FIG. 3 shows the front of the cellular mobile station 5, in the form of a portable handset. As shown, the handset housing includes openings 63 enabling sound to emerge from the speaker 43, as well as openings 65 to allow input of sound to the microphone 41.

The handset 5 includes the visible display screen 49. The handset 5 also includes various keys making up the keypad 47. The keypad 47 typically includes at least two sets of keys 67, 69. The keys 67 represent dialing-input keys. Typically, each of the twelve keys 67 is imprinted with a number from 1 to 0, an asterisk or star (*) or a number sign (#). Each of the keys 67 numbered 2 through 9 also is imprinted with three or four letters, to enable input of alphabetical information.

The keys 69 are function keys. The exemplary set of function keys include a menu scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3 shows three function keys for input of information to and retrieval of information from the processor and memory of the handset and/or selection of features from a displayed menu. One of these keys is the two-way scrolling key 73, for controlling up and down movement of a displayed cursor or highlight function and attendant scrolling of menus shown on the display 49. The exemplary keys also include the selection (SEL) key 67, which enables a user to select an option indicated by the cursor or highlighting. The clear (CLR) key 69 enables the user to erase a selection. A wide variety of other cursor controls and selection inputs could be used. The user operates a power (Pwr) key 83 to toggle the handset 5 on and off.

The keypad 47 supplies user input information to the microprocessor 51, and the microprocessor provides digital data signals to cause the display to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators. Hence, under control of the microprocessor 51 and its programming, the keypad 47 and the display 49 provide a user interface allowing the customer to input information and receive information.

To make a routine telephone call, for example, a user dials in the destination number by actuating the appropriate ones of the number keys 67 and then pushes the send (SND) key 77. As the user presses the number keys, the microprocessor 51 causes the screen 49 to display the dialed number. When it senses the actuation of the send (SND) key 77, the microprocessor 51 generates a call request message in the appropriate protocol. This message includes the dialed destination number. The microprocessor 51 causes the digital transceiver 57 to send the message, as a signaling message, for example over the signaling channel of the particular wireless air-interface to a base station, for call set-up processing by the network 3.

For incoming calls (or other incoming message communications), the digital transceiver 57 detects a paging message addressed to the particular mobile station on the paging channel, as received via the antenna 58. The digital transceiver 57 demodulates and decodes the paging message and forwards the message to the microprocessor 51 for further processing.

Upon receipt of the paging message, the microprocessor 51 determines the status of the mobile station 5, for example, to determine if it is otherwise engaged in an ongoing call or other ongoing communication session. If not engaged, then there is a need to alert the user. Depending on the user-selected mode of operation, the microprocessor 51 may instruct the tone generator 59 to output a selected tone through the speaker 43 or instruct the piezoelectric element 61 to generate perceptible vibrations. The station may generate a vibratory alert, only. Alternatively, the vibratory alert may be generated before, during, after or in-between audible ringing signals produced by the tone generator 59 and the speaker 43.

The user presses the send (SND) key 77 to answer the incoming call. In response, the microprocessor 51 terminates the of the alert signal(s) through the tone generator 59 and/or the piezoelectric element 61. The microprocessor 51 also initiates any necessary signaling through the digital transceiver 57 with the base station 17, to set-up the actual voice grade link. After which the station provides two-way voice communication by means of the microphone 41 and speaker 43, via the vocoder 45 and the digital transceiver 57.

The structure and operation of the mobile station 5, as outlined above, were described to by way of example, only. An example of the monitor tool 21 may be implemented essentially as a trimmed-down version of the mobile station 5. An example of the tool 21 appears in drawing FIG. 4.

FIG. 4 is a functional block diagram of the monitor tool 21. The tool 21 may be incorporated into a variety of form factors for easy transport separate from the mobile station 5, as will be discussed in more detail, later. As shown in FIG. 4 the monitor tool 21 includes a digital receiver (RCVR) 157 coupled to a receiving antenna 158. The receiver 157 connects through RF send and receive amplifiers (not separately shown) to an antenna 158.

The tool 21 may utilize any digital receiver that conforms to current or future developed digital wireless communication standards. For example, the receiver 57 could be a TDMA or GSM unit, designed for cellular or PCS operation. However, to monitor a particular station 5, designed to operate in a particular type of wireless network 3, the monitor 21 will include a digital receiver 157 that corresponds to the digital transceiver 57 in the particular station 5. For example, if the station 5 uses a CDMA type digital transceiver 57, then the monitor tool 21 includes a CDMA type digital receiver 157.

For a CDMA implementation of the network 3 and the mobile station 5, the downlink paging signal is received through page channel, and the uplink signal is sent through an access channel, although TDMA and GSM systems use similar logical channels. The digital receiver 157 therefore has elements or is otherwise adapted to receive at least the paging channel and any other downlink channels normally needed to lock onto the particular network 3. In addition to the downlink receiving functions, the digital receiver 157 receives the uplink channel used for the 'access' channel on the particular type of wireless network 3. In this manner, the digital receiver 157 is capable of monitoring appropriate channels and effectively "listening" for signals on those channels. However, the receiver need not include any additional components as might otherwise be used to receive traffic channels. Hence, the receiver is simpler and smaller than the receiver components in the mobile station transceiver 57. Also, since the receiver 157 need not transmit, over time, its average power consumption is substantially less than that of the transceiver 57 of the mobile station 5.

As shown, the monitor tool 21 includes a one or more LEDs 149 or the like for providing visible output(s). For example, one LED might flash during ringing, as part of the indication of an incoming call or message, whereas a second LED might flash during low-battery indication.

The monitor tool 21 will typically include a limited number of buttons or keys 147, similar to those found on an electronic wristwatch or the like. The keys 147, for example, may allow the user to reset the device 21 after a message alert or a low-battery alert. The keys 147 also may allow the user to select one or more options, if offered by the tool 21, such as different ring tones and/or between ringing and vibratory type alerts for the different types of perceptible notification.

The monitor tool 21 also includes a controller, comprising logic circuitry for controlling the tool's operations. For small size and low-power operation, it may be best to implement the control circuit in the form of a dedicated circuit, for example using discrete components on an integrated circuit. Alternatively, the control circuit may be implemented as an Application Specific Integrated Circuit (ASIC) or a programmable logic gate array (PLGA). In the illustrated example, the monitor tool 21 includes a programmable microprocessor 151, a flash memory 153 for parameter storage and a non-volatile random access memory (RAM) 153 for program storage and working data processing memory. The microprocessor 151, flash memory 153 and RAM 155 may be similar to the elements 51, 53 and 55 described above relative to FIG. 2, however, the elements 151, 153 and 155 in the tool 21 will typically be lower capacity and will draw less power than those used in the full mobile station 5.

The microprocessor 151 controls all operations of the monitor tool 21 in accord with the program stored in the RAM 155. The flash memory is programmed with the identification data of the mobile station 5 that it will monitor. For example, if the station 5 is a typical cellular telephone station, the flash memory 153 is programmed with the MIN and ESN of the particular station 5.

The monitor tool 21 also includes one or more elements for providing perceptible alert signals to the user. In the illustrated example (FIG. 4), the tool 21 includes a tone generator 159 coupled to a speaker 143 and a piezoelectric element 161 serving as a vibrator. The microprocessor 151 provides instructions to the generator 159 and/or to the piezoelectric element 161 to generate various perceptible notifications, in a manner similar to operations of the mobile station 5. Although shown separately for purposes of discussion, the tone generator may be implemented as a function of the controller, in this example, the microprocessor 151.

The tool draws all power from an internal battery 150. The battery 150 may be similar to batteries for wristwatches and the like.

The elements of the monitor tool 21 are configured for easy transport by the user, separate from the mobile station 5 and in a manner or location that allows the user to readily perceive the alerts from the tool 21. If the mobile station 5 is carried in a purse of coat pocket, for example, the user might typically carry the monitor tool 21 outside the purse or pocket. To facilitate such transport, the tool 21 may be configured in a manner to allow the user to wear the tool.

FIG. 5 shows an example of the monitor tool 21A in a housing similar to a housing used for a wristwatch. The housing encases the battery and the various electronic components of the monitor tool, for example as shown in FIG. 4. The housing may contain only the monitor, or the monitor tool may be incorporated together with some other device, such as an electronic watch, a tracking device, etc. The housing of the monitor tool 21A connects to a bracelet or wristband 221, which allows the user to wear the tool 21A on his or her wrist 223.

An alternative approach is to construct the monitor tool into a ring or similar article that may be worn on a finger. FIGS. 6A and 6B show an example of such a configuration. In this example, the tool 21B is encased in a housing attached to the top of a ring 225. As in the embodiment of FIG. 5, the housing may contain the components of the tool alone, or the housing may contain the tool and one or more other electronic devices.

Those skilled in the art will recognize that the monitor tool 21 may be configured as or incorporated into other types of articles that may be readily worn or carried by the user.

For example, the tool may be constructed and worn as a pendant. The monitor may also be built into a pair of eyeglasses, or even into a set of headphones that may be used with an independent portable electronic entertainment unit.

Figure 7:
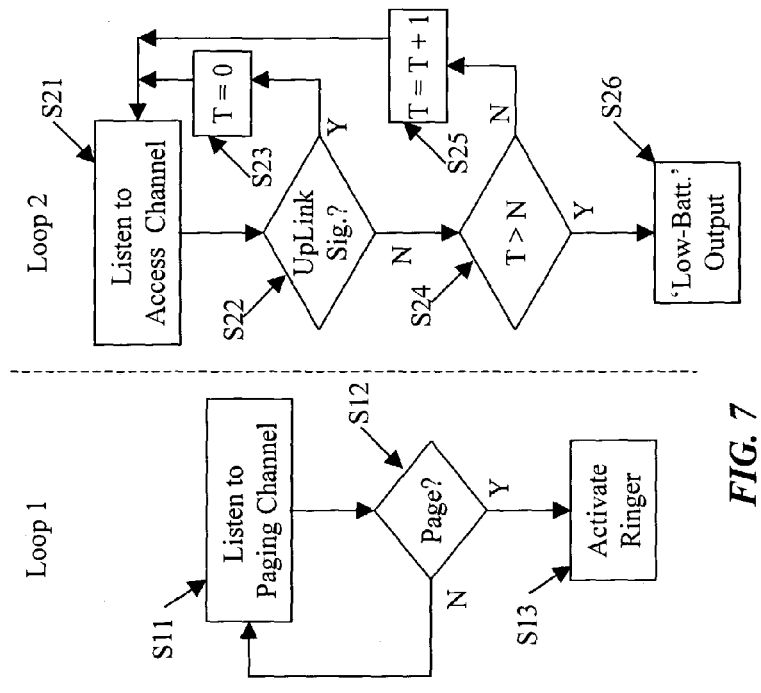
FIG. 7 is a flow chart illustrating two parallel processes enabling the monitor tool to provide an alert for an incoming call or other incoming message and to provide a low-battery indication.

FIG. 7 illustrates a representative example of the process flow implemented by a monitor tool 21. In the example, the monitor tool essentially implements two processing loops in parallel. Loop 1 addresses ringing type alert operations, in response to a page indicating an incoming call or an incoming message directed to the mobile station 5. Loop 2 addresses monitoring of certain message transmissions expected from the mobile station 5, as a way to detect and indicate a low-battery condition or the like.

Hence, in Loop 1, the monitor tool 21 listens to the paging channel (S11). At branch S12, the monitor tool 21 checks to determine if it has detected a page on the paging channel that is specifically directed to the particular mobile station 5, for example, by analyzing received messages to determine if any contain the MIN and/or the ESN of the particular mobile station 5. If not, the processing branches from S12 to S11. Hence, the monitor tool 21 executes a process loop (S11 and S12) until it detects a page specifically addressed to the particular mobile station 5, at which time the processing branches from S12 to step S13. Upon detecting such an addressed page signal at S12, the monitor tool 21 provides its own corresponding alert signal to the user at step S13, essentially to activate a 'ringer' or similar audible alert via the tone generator 149 and speaker 143 and/or a vibratory alert via the piezoelectric element 161. There may also be an associated visible output, via one of the LEDs 149.

In the other processing loop, Loop 2, the monitor tool 21 listens to the uplink access channel (S21). An active mobile station 5 normally transmits over this channel on some known periodic basis, to maintain its registration with the wireless telecommunications network 3, even when the mobile station 5 is not actively engaged in a communication session. Stated another way, the mobile station 5 periodically sends a 'keep-alive' signal over the access channel. The mobile station 5 includes its own identification in the keep-alive signal, for example its MIN and/or its ESN. If the mobile station shuts down, for example, due to low battery power, it will no longer send such signals.

At branch S22, the monitor 21 checks to determine if it has detected a transmission on the access channel from the particular mobile station 5, for example, by analyzing received messages on the access channel to determine if any contain the MIN and/or the ESN of the particular mobile station 5. If the monitor tool 21 detects such a transmission from the particular mobile station 5, processing branches to step S23, in which the monitor 21 resets a time parameter T to 0, and then processing loops back to step S21 to listen for further transmissions.

At step S22, if the monitor tool 21 has not detected a transmission on the access channel from the particular mobile station 5, processing branches to step S24. In step S24, the monitor tool 21 determines if time (T) since the last detected access channel transmission from the particular mobile station 5 exceeds a threshold interval, represented by the programmed value N in this example. If T is less than or equal to N, then the processing branches to step S25, to in increment T by 1 (T=T+1). After step S25, processing again loops back to S21 to listen for further transmissions, however, this loop-back skips the step S23 for resetting the value of T.

The loop through steps S22, S24 and S25 back to S21 effectively causes the monitor 21 to continue listening until the period T since the last detected transmission on the access channel from the particular mobile station 5 exceeds the threshold N. If the monitor tool 21 fails to detect the uplink signal from the mobile station 5 for some period of time, e.g. for period T greater than the threshold N, then the processing in loop 2 branches from step S24 to step S26 in which the tool 21 provides a perceptible signal to the user signifying a low-battery condition.

In step S26, the monitor tool 21 may provide an audible alert signal, such as a distinct tone via the tone generator 149 and speaker 143, and/or provide a vibratory alert via the piezoelectric element 161. The tool 21 may also provide an associated visible output, via one of the LEDs 149.

As noted, if the battery of the mobile station 5 runs low, the station shuts down and stops sending its access channel signals. The processing in Loop 2 detects the lack of access channel transmissions, for some period exceeding the threshold, and provides an appropriate alert to the user. However, the loss of access channel transmissions may also arise as a result of other conditions, for example, when the mobile station 5 is out of range of the monitor tool 21 or the access channel signals from the mobile station 5 are blocked by some obstacle in the surrounding environment, such as a building.

As shown by the discussion above, the exemplary monitor tool 21 monitors certain signaling communications between the mobile station 5 and the wireless network 3. Based on the signaling, the tool 21 detects a page (indicating an incoming call or message) and detects a loss of signaling from the station 5 (indicating for example a low battery condition). In response, the tool provides perceptible alerts to the user. The tool, however, may be more convenient to transport than the mobile station itself. Hence, if the user opts to carry the mobile station in a pocket or purse or the like, the user may still receive the alerts by carrying or wearing the smaller more convenient monitor tool.

Because the monitor is a separate and independent device, the monitor tool 21 does not draw power from the battery of the mobile station 5. However, use of the monitor tool with the mobile station 5 does not require any actual modification or enhancement to the mobile station, itself.

While the foregoing has described what are considered to be the best mode and/or other examples, it is understood that various modifications may be made therein and that the invention or inventions disclosed herein may be implemented in various forms and examples, and that they may be applied in numerous applications, only some of which have been described herein. It is intended by the following claims to claim any and all modifications and variations that fall within the true scope of the inventive concepts.

What is claimed is:

1. A monitor tool for providing a status alert to a user regarding status of the user's separate mobile station, the tool comprising:

a wireless receiver for receiving signals on at least one signaling channel of a wireless communication network used by the mobile station;

a memory storing identification data for the mobile station used in signaling messages for the mobile station communicated to or from the mobile station via the at least one signaling channel of the wireless communication network;

an alert generator for producing an indication of mobile station status perceptible by the user; and a controller, responsive to receipt of one or more signaling messages over the at least one signaling channel by the wireless receiver containing identification data matching the stored identification data for the mobile station, for recognizing occurrence of at least one status of the mobile station and activating the alert generator to output the perceptible indication of mobile station status to the user, wherein:

the wireless receiver comprises a receiver for receiving an access channel of the wireless communication network; and the controller causes the alert generator to output the perceptible status indication upon failure of the access channel receiver to receive an access message containing identification data matching the stored identification data of the mobile station for a period of time.

2. The monitor tool as in claim 1, further comprising a housing containing the wireless receiver, the memory, the alert generator and the controller; wherein the housing is adapted to allow the user to wear the monitor tool.

3. The monitor tool as in claim 2, further comprising a wristband attached to the housing to enable the user to wear the monitor tool on a wrist.

4. The monitor tool as in claim 1, wherein the alert generator comprises one or more of: a tone generator, a light emitting element, and a vibration generator.

5. The monitor tool as in claim 1, wherein:

the wireless receiver comprises a receiver for receiving a paging channel of the wireless communication network; and the controller causes the alert generator to output a perceptible indication of an incoming communication when the paging channel receiver receives a paging signal containing identification data matching the stored identification data of the mobile station.

6. A monitor tool for providing a status alert to a user regarding status of the user's separate mobile station, the tool comprising:

a wireless receiver for receiving signals on at least one signaling channel of a wireless communication network used by the mobile station;

a memory storing identification data for the mobile station used in signaling messages for the mobile station communicated to or from the mobile station via the at least one signaling channel of the wireless communication network;

an alert generator for producing an indication of mobile station status perceptible by the user; and a controller, responsive to receipt of one or more signaling messages over the at least one signaling channel by the wireless receiver containing identification data matching the stored identification data for the mobile station, for recognizing occurrence of at least one status of the mobile station and activating the alert generator to output the perceptible indication of mobile station status to the user, wherein the perceptible status indication comprises a low-battery indicator.

7. The monitor tool as in claim 6, wherein the wireless receiver is configured to receive at least one signaling channel of a mobile telephone type wireless communication network.

8. The monitor tool as in claim 7, wherein the at least one signaling channel comprises a paging channel.

9. The monitor tool as in claim 7, wherein the at least one signaling channel comprises an access channel.

10. The monitor tool as in claim 7, wherein the at least one channel comprises a paging channel and an access channel.

11. A monitor tool for providing a status alert to a user regarding status of the user's separate mobile station, the tool comprising:

a wireless receiver for receiving signals on at least one signaling channel of a wireless communication network used by the mobile station;

a memory storing identification data for the mobile station used in signaling messages for the mobile station communicated to or from the mobile station via the at least one signaling channel of the wireless communication network;

an alert generator for producing an indication of mobile station status perceptible by the user; and a controller, responsive to receipt of one or more signaling messages over the at least one signaling channel by the wireless receiver containing identification data matching the stored identification data for the mobile station, for recognizing occurrence of at least one status of the mobile station and activating the alert generator to output the perceptible indication of mobile station status to the user, wherein:

the wireless receiver is configured to receive at least one signaling channel of a mobile telephone type wireless communication network;

the at least one channel comprises a paging channel and an access channel;

the controller causes the alert generator to output a first perceptible indication of an incoming communication when the wireless receiver receives a paging signal containing identification data matching the stored identification data of the mobile station; and the controller causes the alert generator to output a second perceptible status indication upon failure of the wireless receiver to receive an access message containing identification data matching the stored identification data of the mobile station for a period of time.

12. The monitor tool as in claim 11, wherein:

the first perceptible indication comprises an incoming call indicator; and the second perceptible indication comprises a low-battery indicator.

13. A method of providing an alert to a user of a mobile station, comprising:

monitoring a signaling channel of a wireless communication network used by the mobile station;

detecting a signaling message addressed to the mobile station, on the signaling channel;

in response to the detected signaling message addressed to the mobile station, generating a first perceptible alert indicating an incoming communication directed to the mobile station, wherein the steps of monitoring, detecting and generating are performed separately and independently of the mobile station and any internal operations of the mobile station;

monitoring a signaling channel of the wireless communication network for periodic signals transmitted by the mobile station;

detecting a failure to receive any of the periodic signals from the mobile station for a period of time; and in response to the failure to receive periodic signals from the mobile station, generating a second perceptible alert.

14. The method as in claim 13, wherein:
the monitored signaling channel comprises a paging channel of a mobile telephone network; and
the first perceptible alert indicates an incoming call through the mobile telephone network intended for the mobile station.

15. A method of providing an alert to a user of a mobile station, comprising:
monitoring an access channel of a wireless communication network used by the mobile station and detecting signaling messages from the mobile station on the access channel;
detecting a lack of any signaling messages from the mobile station on the access channel for a period of time; and
in response to the detected lack of messages from the mobile station, providing a perceptible alert to the mobile station user, wherein the perceptible alert signifies a low-battery condition of the mobile station.

16. The method as in claim 15, wherein the monitored access channel is an access channel of a mobile telephone network.

\* \* \* \* \*